US008153014B2

(12) United States Patent  (10) Patent No.: US 8,153,014 B2
Doorn et al.  (45) Date of Patent: Apr. 10, 2012

(54) SEPARATION OF CARBON NANOTUBES INTO CHIRALLY ENRICHED FRACTIONS

(75) Inventors: Stephen K. Doorn, Los Alamos, NM (US); Sandip Niyogi, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 950 days.

(21) Appl. No.: 12/150,813

(22) Filed: Apr. 30, 2008

(65) Prior Publication Data

US 2009/0324483 A1  Dec. 31, 2009

(51) Int. Cl.
*B01D 21/26*  (2006.01)
*D01F 9/12*  (2006.01)
(52) U.S. Cl. ..... 210/781; 210/787; 210/789; 210/360.1; 210/380.1; 423/447.1; 423/461; 977/750
(58) Field of Classification Search .................. 210/781, 210/787, 789, 198.2, 360.1, 380.1; 423/447.1, 423/461; 977/750
See application file for complete search history.

(56) References Cited

U.S. PATENT DOCUMENTS 7,662,298 B2 *  2/2010  Hersam et al. ................ 210/781

FOREIGN PATENT DOCUMENTS

WO  WO 2006/096613  9/2006

OTHER PUBLICATIONS

Hersam et al., "Separation of Carbon Nanotubes in Density Gradients," WO 2006/096613 A2, published Sep. 14, 2006.

Zheng et al., "DNA-Assisted Dispersion and Separation of Carbon Nanotubes," Nature Materials, vol. 2, May 2003, pp. 338-342.
Zheng et al., Structure-Based Carbon Nanotube Sorting by Sequence-Dependent DNA Assembly, Science, vol. 302, Nov. 2003, pp. 1545-1548.
Arnold et al., Enrichment of Single-Walled Carbon Nanotubes by Diameter in Density Gradients, Nano Lett., vol. 5, No. 4, Mar. 2005, pp. 713-718.
Arnold et al, "Sorting Carbon Nanotubes by Electronic Structure using Density Differentiation," Nature, vol. 1, Oct. 2006, pp. 60-65.
Yanagi et al., "Optical and Conductive Characteristics of Metallic Single-Wall Carbon Nanotubes with Three Basic Colors; Cyan, Magenta, and Yellow" Appl. Phys. Express 1, Feb. 2008, pp. 34003-1-34003-3.
Zhang et al., "Assessment of Chemically Separated Carbon Nanotubes for Nanoelectronics," J. Am. Chem. Soc., Feb. 2008, vol. 130, No. 8, pp. 2686-2691.
Niyogi et al., "Selective Aggregation of Single-Walled Carbon Nanotubes via Salt Addition," J. Am. Chem. Soc., Jan. 2007, vol. 129, No. 7, pp. 1898-1899.

* cited by examiner

*Primary Examiner* — David A Reifsnyder
(74) *Attorney, Agent, or Firm* — Samuel L. Borkowsky

(57) ABSTRACT

A mixture of single-walled carbon nanotubes ("SWNTs") is separated into fractions of enriched chirality by preparing an aqueous suspension of a mixture of SWNTs and a surfactant, injecting a portion of the suspension on a column of separation medium having a density gradient, and centrifuging the column. In some embodiments, salt is added prior to centrifugation. In other embodiments, the centrifugation is performed at a temperature below room temperature. Fractions separate as colored bands in the column. The diameter of the separated SWNTs decreases with increasing density along the gradient of the column. The colored bands can be withdrawn separately from the column.

9 Claims, 2 Drawing Sheets

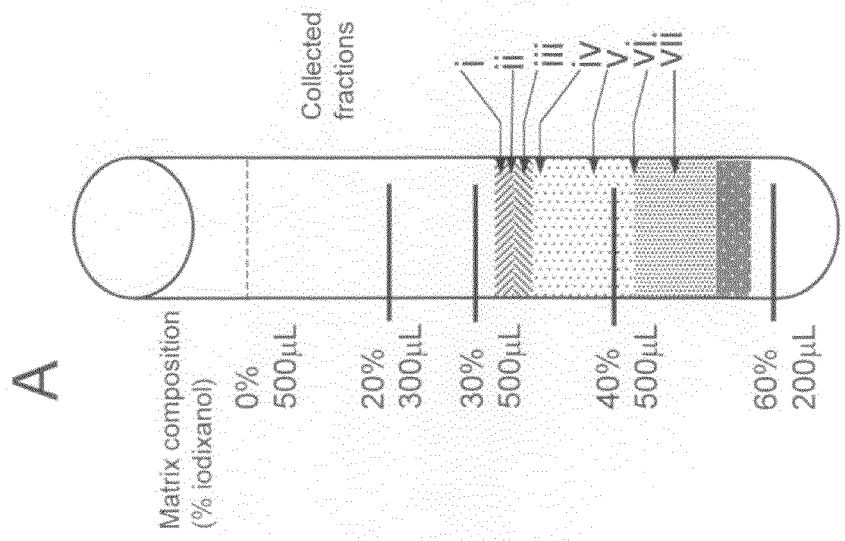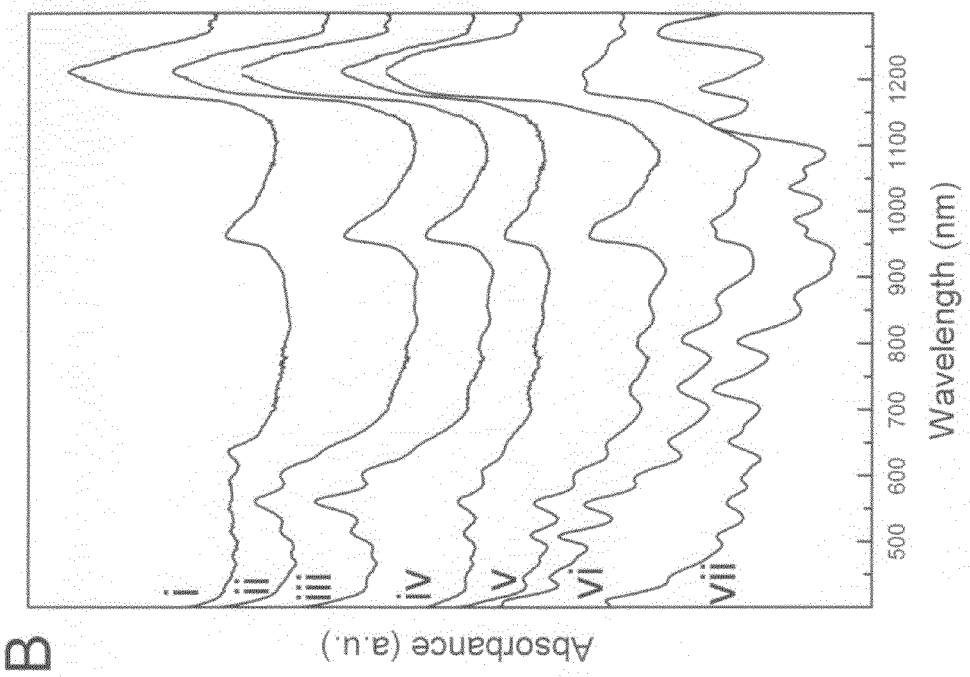
Figure 2

SEPARATION OF CARBON NANOTUBES
INTO CHIRALLY ENRICHED FRACTIONS

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to a method of separating carbon nanotubes into chirally enriched fractions, and to a kit useful for the method.

BACKGROUND OF THE INVENTION

Carbon nanotubes are seamless, nanometer scale, single-walled or multiple-walled tubes of graphite sheets with fullerene caps. Single-walled carbon nanotubes (SWNTs) are generally either of the metallic-type or the semiconducting-type. SWNTs have shown promise for nanoscale electronics, chemical sensors, biological imaging, high strength materials, field emission arrays, tips for scanning probe microscopy, gas storage, photonics, and other important applications. The realization of the potential of SWNTs for these and other applications will likely depend on the availability of bulk quantities of SWNTs having uniform properties.

Most synthetic methods for producing SWNTs (arc and laser techniques, carbon vapor deposition, catalytic cracking of hydrocarbons, catalytic disproportionation of carbon monoxide, for example) result in mixtures of metallic and semiconducting SWNTs having a broad range of nanotube chiralities, diameters, and energy bandgaps. Mixtures of SWNTs are generally unsuitable for nanoscale electronics and other applications because the properties of SWNT mixtures are not uniform.

SUMMARY OF THE INVENTION

In accordance with the purposes of the present invention, as embodied and broadly described herein, an aspect of the invention is concerned with a method for producing enriched chirality fractions of single-walled carbon nanotubes from a mixture. The method involves forming an aqueous suspension comprising a mixture of carbon nanotubes and a surfactant; adding a chosen amount of an aqueous salt solution to the aqueous suspension, and thereafter putting the resulting suspension with added salt on a liquid column of a separation medium having a density gradient; and thereafter subjecting the column to centrifugation, thereby producing chirally enriched fractions of single-walled carbon nanotubes.

Another aspect of the invention is concerned with kits for forming a sample of chirally enriched single-walled nanotubes. An embodiment kit includes a mixture of single-walled carbon nanotubes; a surfactant useful for forming an aqueous suspension of said mixture of carbon nanotubes; a salt for adding to the suspension; and a set of instructions for forming a chirally enriched fraction of single-walled carbon nanotubes using said mixture, said surfactant, and said salt. Another embodiment kit includes an aqueous suspension of a mixture of single-walled carbon nanotubes with a chosen amount of salt, and a set of instructions for forming a chirally enriched fraction of single-walled carbon nanotubes using said suspension.

The invention is also concerned with a method for preparing a column of liquid separation medium. The method involves preparing a plurality of aqueous solutions of liquid comprising iodixanol and sodium dodecyl sulfate, each solution having a different density, placing the solutions one at a time into an empty tube while the tube is inclined at an angle of about 10 degrees with respect to vertical, the first solution going into the tube having the highest density, and then in order of decreasing density afterward such that mixing is minimized between solutions, and allowing the solutions in the tube to diffuse into each other, thereby preparing a column of liquid separation medium.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A shows a schematic representation of a column of SWNTs separated according to a second embodiment of the invention using $MgCl_2$ and FIG. 2B shows absorbance spectra of separated fractions of SWNTs depicted in FIG. 2A. FIG. 2B shows better resolution of metallic and semiconductor SWNTs compared to the embodiment shown in FIG. 1A.

DETAILED DESCRIPTION

Figure 1:
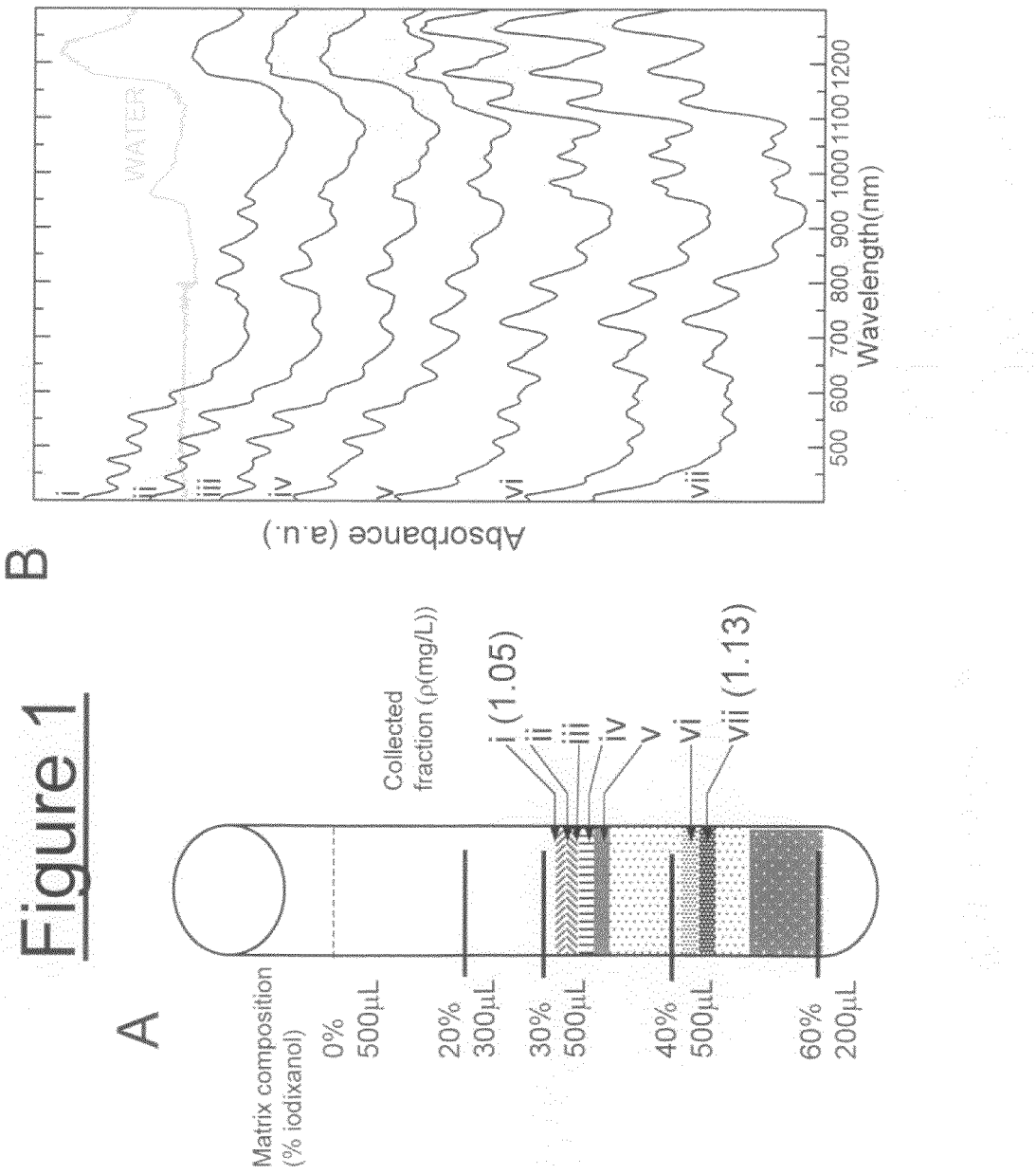
FIG. 1A shows a schematic representation of a column of SWNTs separated according to an embodiment of the present invention using NaCl.
FIG. 1B shows absorbance spectra of separated fractions of SWNTs depicted in FIG. 1A.

The present invention is concerned with forming chirally enriched fractions of single-walled carbon nanotubes from a mixture, and with kits useful for forming these fractions. The invention may be used to produce a fraction that is enriched in a narrow range of SWNT chiralities, or in a single chirality. Separation of SWNTs into fractions enriched in a single chirality is important for developing applications in areas such as, but not limited to, nanoelectronics, sensors, imaging, tagging, photonics and smart materials applications.

The method of separating a mixture of SWNTs into chirality-enriched fractions is a rapid method that can be used to separate mixtures of SWNTs on a milligram scale, on a gram scale, on a kilogram scale, or higher. The method can be scaled to produce chirally enriched fractions of SWNTs on an industrial scale.

A "suspension of SWNTs" refers to an aqueous mixture of SWNTs with a surfactant that has been subjected to ultrasonication. Surfactants useful with this invention typically have a long alkyl chain terminating in a polar head group. Examples of surfactants include those with $C_6$-$C_{24}$ alkyl chains having either anionic ($SO_4^-$, for example) or cationic ($NH_4^+$, for example) head groups. A preferred surfactant with an anionic head group is sodium dodecyl sulfate ("SDS"). An example of a surfactant with a cationic headgroup is cetyltrimethylammonium bromide (CTAB).

The mixing and ultrasonication of the suspension is followed by centrifugation to remove large SWNT aggregates and produce a visibly clear, black liquid phase that is stable upon standing at room temperature for 6 months or longer.

In some embodiments, after preparing the aqueous suspension of SWNTs and surfactant, a chosen amount of a dilute aqueous solution of an inorganic salt is added to the suspension. The dilute salt solution is added slowly to a stirring aqueous suspension of SWNTs such that no localized high salt-density regions are generated in the SWNT suspension. The addition of the salt solution should not visibly change the homogeneity of the aqueous suspension of SWNTs. For example, after adding a solution of NaCl to the supernatant, the concentration of NaCl in the mixture of supernatant and NaCl may be 0.01M, 0.04M, 0.07M, 0.08M, 0.09M, 0.10M, 0.12M, 0.13M, 0.17M, or 0.18M without visibly changing the homogeneity of the SWNT suspension. The added salt can be any soluble inorganic salt that does not undergo a chemical reaction with the surfactant molecules or the SWNTs. Examples of chemical reactions to be avoided include redox reactions with either the SWNTs, or the surfactant molecules, or reactions that result in the polymerization, coagulation, or degradation of the surfactant molecules. The amount of added salt depends on the nature of the salt (monovalent, divalent, trivalent cations), the concentration of the SWNTs in the suspension, the concentration of surfactant in the suspension, and the desired chirality or range of chiralities of SWNTs in the enriched fraction. Some non-limiting examples of useful soluble inorganic salts have cations such as alkali cations (sodium, for example), alkaline earth cations (magnesium, for example), and Group III cations (erbium, for example).

Shortly after adding the soluble inorganic salt to the aqueous suspension of SWNTs, the suspension is placed on top of a column of a liquid separation medium. The liquid column has a continually increasing density from the top of the column to the bottom of the column. A useful separation medium is an aqueous solution of a non-ionic material with a density larger than the highest density SWNTs, and that doesn't chemically react with SWNTs or the surfactant. Any liquid separation medium with these characteristics can be used. Examples of useful, non-ionic, separation media include, but are not limited to, aqueous solutions of polysaccharides and iodinated compounds. A preferred medium is a 60% (w/v) aqueous solution of Iodixanol.

The top of the column of the liquid separation medium supports the weight of the SWNT suspension. After placing the suspension on top of the column of the liquid separation medium, the liquid column is then subjected to centrifugation. Centrifugation drags the SWNTs towards the bottom of the centrifuge tube. The result is the formation of colored bands throughout the liquid column. A colored band includes SWNTs of different diameters and chiralities having the same density.

The fractions that form upon centrifugation can be isolated by sequentially withdrawing portions of liquid from the column using a pipette or syringe. Each fraction can then be weighed. The volume of the fraction is measured as it is removed from the column. With the volume and weight, the density of each fraction can then be calculated. Electronic spectra (absorbance, emission and Raman) of each fraction were then obtained to determine the chirality of the nanotubes present in the fraction. The SWNT composition of a fraction was determined by assigning the peaks in the spectrum to particular chiralities. Assignments were based on previously published theoretical or experimentally determined values. The presence of a peak provides evidence that the fraction includes the SWNT chirality that produces the peak. Conversely, the absence of a particular peak indicates the absence of the particular chirality known to produce that peak.

By adjusting the temperature at which the sample is held during centrifugation, the separation resolution may be optimized. The optimum temperature depends on the nature of the added soluble inorganic salt. The optimum temperature for NaCl is not necessarily the same as for $MgCl_2$. The temperature range is generally from about 10 degrees Celsius to about 30 degrees Celsius. To find the optimum temperature for NaCl for example, a separation is performed at 25 degrees Celsius and the quality of the separation is analyzed. Following that the temperature is lowered a few degrees and the results are compared.

Another aspect of the invention involves a method for forming the same colored bands without the addition of the soluble inorganic salts. After placing the SWNT suspension on top of the column of the liquid separation medium, the liquid column is then subjected to centrifugation at a temperature lower than the Kraft point for the surfactant. The Kraft point is the melting point of a hydrated surfactant and is raised by the addition of salt in water. The Kraft point of hydrated SDS for example is 25 degrees Celsius.

Another aspect of the present invention is also concerned with kits useful for separating a mixture of SWNTs into fractions of enriched chirality. An embodiment kit includes a suspension of a SWNT mixture and sodium dodecyl sulfate and instructions for separating the SWNTs into fractions of enriched chirality. Another embodiment kit also includes salt to be added to the suspension. Yet another embodiment kit also includes a liquid separation medium. Still another embodiment kit also includes a centrifuge tube useful for preparing a column of liquid separation medium.

Some EXAMPLES below illustrate the operability of the invention. In the examples below, the SWNTs were obtained from Rice University. They were produced using a HiPco™ process (batch #HPR 107.1). Their diameter was in the range of 0.7-1.5 nanometers ("nm"). Each IODIXANOL column used for each of the separations in the EXAMPLES below was prepared by making a series of solutions of varying concentrations of IODIXANOL beginning with commercially available 60% (w/v) aqueous solution of IODIXANOL (OptiPrep density gradient medium, Aldrich Chemical Co.) and then adding to the IODIXANOL a solution of SDS (2%, weight/volume) in $H_2O$. The solutions had IODIXANOL concentrations of 20%, 30%, 40%, and 60%. The column was prepared by first adding 0.2 ml of the 60% solution to the column, then adding 0.5 ml of the 40% solution on top of the 60% solution (the 60% solution has the higher density than the 40% solution), then adding 0.5 ml of the 30% solution, and finally adding 0.3 ml of the 20% solution. The solutions were added in slowly to minimize mixing between them. The column was placed at an angle of 10 degrees from the vertical and the solutions were allowed to diffuse slowly into each other over a period of about 1 hour. After this time, the menisci separating the different density regions were not discernable. A Beckmann-Coulter L8-90M ultracentrifuge was used for all experiments. A Beckmann-Coulter SW60Ti rotor was used for all separations. A Cole-Parmer 750 Watt Ultrasonic processor was used for all sonication. To record the absorbance spectrum, the desired fractions were collected using a micropipette and diluted using 2% SDS-$D_2O$. A Varian Cary 6000i spectrometer was used to record the absorbance spectra.

EXAMPLE 1

Separation of SWNTs into chirally enriched fractions using sodium chloride. An aqueous suspension of single-walled carbon nanotubes was prepared as follows: 20 milligrams ("mg") of SWNTs and 1 gram sodium dodecyl sulfate ("SDS") were added to 100 milliliters ("ml") $D_2O$. The resulting mixture was sonicated at 35-40 Watts for 15 min, while maintaining the solution temperature between 25-30 degrees Celsius using an ice-water bath. Subsequently the suspension was centrifuged using a Beckmann-Coulter SW28 rotor at 141,000×g for 4 hours at a temperature of 25 degrees Celsius. The centrifuged product included a supernatant that was removed from the remaining product. The supernatant had a density of 1.12 g/mL. A 500-microliter ("μL") portion of the supernatant was stirred with a magnetic stirrer. To the stirred portion 60 μL of 1M NaCl was added. After adding the salt solution, the resulting suspension was injected above an iodixanol column, and the column was then centrifuged at 250,000×g for 6 hours at T=22° C. A schematic representation of the resulting separation is shown in FIG. 1. FIG. 1A, is a representation of the actual column after centrifugation and shows several bands which represent fractions of the separated SWNTs. The column shows eight major bands. The top most bands were colored purple. Below the purple bands were several green bands. The absorption spectrum of the top 50 μL of the purple band fraction, fraction i is shown in FIG. 1B. The spectral peaks are assigned to the metallic SWNTs mixed with the large (0.9-1.4 nm) diameter semiconducting SWNTs. A spectrum of $H_2O$ is included to show its interference in the spectra of the collected SWNT fractions. Fractions ii-v were the next 100 μL, 50 μL, 100 μL and 100 μL respectively of the purple colored bands. These bands represent the lowest density regions (1.05-1.09 g/mL) of the column. The top green bands (150 μL) included minor amounts of the metallic chiralities (FIG. 1B, fraction vi). The pure, small diameter semiconducting chiralities (0.6-1.1 nm diameter) were separated as a dark green colored band (200 μL) located about 1 centimeter ("cm") from the bottom of the centrifuge tube (FIG. 1B fraction vii). The densities of the SWNTs present in this fraction were measured in a range from 1.09 g/ml to 1.13 g/ml.

EXAMPLE 2

Separation of SWNTs into chirally enriched fractions using sodium chloride. In this example, the procedure is essentially that of EXAMPLE 1 with the exception that the suspension of SWNTs is prepared with $H_2O$ instead of with $D_2O$.

EXAMPLE 3

Separation of SWNTs into chirally enriched fractions using magnesium chloride. An aqueous suspension of single-walled carbon nanotubes was prepared as in EXAMPLE 1. A 500-μL portion of the SWNT suspension was mixed with 50 μL of 0.1M $MgCl_2$. The resulting suspension was injected on top of a column of IODIXANOL as described in EXAMPLE 1. The column was then centrifuged for at 250,000×g for 8 hours at a temperature of 25 degrees Celsius. A schematic representation of the resulting separation is shown in FIG. 2. FIG. 2A, is a representation of the actual column after centrifugation and shows several bands which represent fractions of the separated SWNTs. The top most band was blue colored. This band was fractionated into two 50 μL fractions, labeled as Fraction i and Fraction ii. The absorbance spectra of these fractions (FIG. 2B) show metallic SWNTs of different diameter distributions. The next band was pink colored and is labeled Fraction iii. A 50 μL volume of this fraction was isolated and the absorbance spectrum shows all the metallic SWNTs, in FIG. 2B Fraction iii. The semiconductor SWNTs separated at the same region as in EXAMPLE 1, and the intermediate volume of the column also had the same appearance.

EXAMPLE 4

Separation of SWNTs into chirally enriched fractions using $ErCl_3$. An aqueous suspension of single-walled carbon nanotubes was prepared as in EXAMPLE 1. A 300-μL portion of the suspension was mixed with 10 μL of 0.025M $ErCl_3$. The resulting suspension was injected on top of a column of IODIXANOL as described in EXAMPLE 1. The column was centrifuged for 12 hours at a temperature of 22 degrees Celsius. After centrifugation, the metallic SWNTs separated as fractions at the lowest density region of the column. The largest diameter metals separate as the topmost light blue colored band followed by the smaller diameter metals as a pink colored band. The pure semiconductors are separated at the same region as in EXAMPLE 1 and the intermediate volume of the column also had the same appearance. A general observation with regard to the separations described in this EXAMPLE and EXAMPLE 1 and EXAMPLE 3 is that the separation appears to improve for $Er^{+3}$ compared to $Mg^{+2}$ and for $Mg^{+2}$ compared to $Na^+$.

EXAMPLE 5

An aqueous suspension of single-walled carbon nanotubes was prepared as in EXAMPLE 1. A 500-μL portion of the suspension was injected without any addition of salt solution, on top of a column of IODIXANOL and centrifuged as described in EXAMPLE 1, at 25 degrees Celsius. The SWNTs form a dark band having a density of about 1.2 g/mL with poor color resolution, or no color resolution.

EXAMPLE 6

Separation of SWNTs into chirally enriched fractions. In this EXAMPLE, the procedure is essentially the same as that in EXAMPLE 5 with the exception that the column was centrifuged at a temperature of about 15 degrees Celsius. In contrast to results of EXAMPLE 5, where separation into colored bands did not occur, the result of this EXAMPLE was the production of colored bands with an appearance similar to that in EXAMPLE 1.

EXAMPLE 7

Use of separation column with salt gradient. An aqueous suspension of single-walled carbon nanotubes was prepared as in EXAMPLE 1. A column of IODIXANOL is prepared according to EXAMPLE 1 with the exception that salt is added to the column, thus forming a column of IODIXANOL having a salt gradient that is less concentrated at the top of the column and increases in concentration towards the bottom of the column. A 500-μL portion of the suspension was injected on top of a column of IODIXANOL. The column was centrifuged as described in EXAMPLE 1. Separation into colored bands was still obtained and the semiconducting chiralities were isolated free of the metallic chiralities, but the overall yield was lower due to loss on the centrifuge tube walls.

EXAMPLE 8

The effect of salt concentrations on the separation. The separation was performed at 25 degrees Celsius using a mixture of supernatant and NaCl solutions having a final NaCl concentration in the mixture in the range 0.01M to 0.45M. A NaCl concentration of 0.01M was found insufficient at a temperature of 25 degrees Celsius for separating the carbon nanotubes into colored bands. Concentrations in the range of 0.04M to 0.18M were found to be sufficient for separation at 25 degrees Celsius (see EXAMPLE 1, for a NaCl concentration of 0.1M). All separations performed using NaCl solutions in this range produced a series of purple bands on top of the column and green bands below the purple bands. The purple bands included the higher diameter semiconducting SWNTs and the metallic SWNTs. The green bands included the lower diameter semiconducting SWNTs. Separations performed using NaCl solutions having a concentration greater than 0.2M produced grey bands instead of purple and green bands. The grey bands were physically separated by removing fractions as described before, and the individual fractions were characterized by absorption spectroscopy. The absorption spectra of the separated bands indicate that the addition of the higher concentration of NaCl to the supernatant changes the supernatant in a manner different compared to when lower concentrations of NaCl are used. This is reflected in the composition of the separated bands after centrifugation. The topmost grey band, which has the lowest density, includes SWNTs composed of both large diameter and small diameter SWNTs. Thus, the separation does not appear to be one based merely on the diameter of the SWNTs as was observed in EXAMPLE 1.

EXAMPLE 9

Additional temperature effects. The separation was performed at about 15 degrees Celsius using a mixture of supernatant and NaCl solutions having a NaCl concentration of 0.04 M and 0.09 M. It was found that centrifugation under these conditions resulted in purple bands and green bands as described in EXAMPLE 1, but the relative positions of these bands with respect to the density of the column changed. In EXAMPLE 1, the purple bands were found in the low density regions of the column, and the green bands were found at higher density regions. Now, in this EXAMPLE, a green band was observed at a lower density than the purple band.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing enriched chirality fractions of single-walled carbon nanotubes from a mixture, comprising:
   forming an aqueous suspension comprising a mixture of carbon nanotubes and sodium dodecylsulfate;
   adding a chosen amount of an aqueous sodium chloride solution to the aqueous suspension, and thereafter
   putting the aqueous suspension, now with added sodium chloride, on a liquid column of a separation medium having a density gradient; and thereafter
   subjecting the column to centrifugation, thereby producing chirally enriched fractions of single-walled carbon nanotubes.

2. The method of claim 1, further comprising isolating an enriched chirality fraction after subjecting the column to centrifugation.

3. The method of claim 1, wherein the separation medium comprises IODIXANOL.

4. The method of claim 1, wherein the step of subjecting the column to centrifugation results in a fraction that is chirally enriched in metallic single-walled carbon nanotubes.

5. The method of claim 1, wherein the step of subjecting the column to centrifugation results in a fraction that is chirally enriched in semiconductor single-walled carbon nanotubes.

6. The method of claim 1, wherein the diameter of the single walled nanotubes included in the chirally enriched fractions decreases with the density gradient.

7. A kit, comprising:
   a mixture of single-walled carbon nanotubes;
   sodium dodecylsulfate surfactant useful for forming an aqueous suspension of said mixture of carbon nanotubes;
   an aqueous sodium chloride solution for adding to the suspension; and
   a set of instructions for forming chirally enriched fractions of single-walled carbon nanotubes using said mixture, said surfactant, and said aqueous sodium chloride solution, said instructions including a step of forming a suspension of the mixture of single-walled carbon nanotubes with sodium dodecylsulfate surfactant and a step of adding said aqueous sodium chloride solution to the suspension.

8. The kit of claim 7, further comprising a liquid separation medium useful for forming fractions of chirally enriched single-walled carbon nanotubes from said mixture.

9. A kit, comprising:
   an aqueous suspension of a mixture of single-walled carbon nanotubes, sodium chloride, and sodium dodecyl sulfate; and
   a set of instructions for forming chirally enriched fractions of single-walled carbon nanotubes using said suspension, said instructions including step of putting said aqueous suspension on a separation medium.

* * * * *